United States Patent [19]
Kinsella et al.

[11] 3,841,552
[45] Oct. 15, 1974

[54] MANIFOLD VALVE FOR DOMESTIC GAS OVENS

[75] Inventors: Howard R. Kinsella; Carl A. Smith, both of St. Louis, Mo.

[73] Assignee: Emerson Electric Co., St. Louis, Mo.

[22] Filed: Jan. 8, 1973

[21] Appl. No.: 322,114

[52] U.S. Cl. .................. 236/99, 236/15 A, 431/54
[51] Int. Cl. ............................................. F23n 1/00
[58] Field of Search ................ 236/15 A, 40 R, 99; 431/54, 53

[56] References Cited
UNITED STATES PATENTS

| | | | |
|---|---|---|---|
| 2,911,152 | 11/1959 | Weber et al. | 431/54 X |
| 3,448,923 | 6/1969 | Saponara | 236/99 G |
| 3,563,457 | 1/1971 | Bergquist | 236/68 D |
| 3,711,236 | 1/1973 | Kinsella et al. | 236/68 D |

Primary Examiner—William E. Wayner
Attorney, Agent, or Firm—Charles E. Markham

[57] ABSTRACT

A flow control device for gas range ovens in which a main valve controlling the main burner outlet is operated in an "on" and "off" manner by an adjustable thermostat to maintain selected oven temperatures throughout, from warming, through baking, to broiling temperatures, and a bypass around the main valve opens to maintain a minimum constant burner flame when the thermostat is adjusted to broil temperature. The device further includes a thermoelectric safety cutoff valve controlling the fuel supply inlet thereto, a rotatable manual plug valve between the safety valve and the main valve, and a pilot gas outlet between the safety valve and the manual valve. The rotation of a single knob rotates the manual valve, adjusts the thermostat, and resets the safety valve.

2 Claims, 15 Drawing Figures

MANIFOLD VALVE FOR DOMESTIC GAS OVENS

This invention relates to gas flow control devices for gas burners which include a pilot flame responsive safety cutoff valve and a manual shutoff valve in addition to a thermostatically controlled valve, and particularly to a device of this kind adapted to controlling domestic gas range oven burners.

BACKGROUND OF INVENTION

For many years, domestic oven burner control valves have been operated by adjustable thermostats in a manner to variably throttle or modulate the flow of gas to the burner so as to maintain selected baking and broiling temperatures. However, in this method of burner control, the turndown limit at which the oven burner will continue to operate reliably precludes attaining a desired lower range of oven temperature. To attain these lower oven temperatures, one widely used system includes an "on" and "off" valve interposed between the thermostatic modulating valve and the oven burner, which valve is operative during low temperature range adjustments to operate the burner in an on and off manner and to vary the ratio of on time to off time operation of the burner so as to achieve the desired lower oven temperatures while maintaining a sufficient rate of flow to the burner.

The operation of this on and off valve is effected by a heat motor receiving its heat from an auxiliary pilot burner, the fuel to the auxiliary pilot burner being controlled by the thermostatically operated modulating valve. The arrangement is such that the auxiliary pilot burner receives sufficient fuel to maintain the on and off valve in an on or open position whenever the modulating valve thermostat is set for high oven temperatures, but when set for lower temperatures, the modulating valve, being almost closed, cycles the auxiliary pilot burner on and off.

This arrangement further includes a stand-by pilot burner which intermittently ignites the auxiliary pilot burner, which, in turn, intermittently ignites the main burner during operation at the lower oven temperature settings. Customarily, there has been no provision in this arrangement to effect the cutoff of fuel flow to the stand-by pilot burner in event of flame failure, so that a hazardous condition could occur even though the flow rate to the stand-by pilot is quite low. The provision of a resettable thermoelectric safety shutoff valve in this arrangement to cut off all flow in event of pilot flame failure, in addition to the heat motor operated on and off valve, would have considerably increased the cost of the device.

Currently, it is considered that thermostatically controlled on and off operation of the oven burner is a quite satisfactory method of maintaining selected oven temperatures in the baking and broiling range as well as in the lower oven temperature range. However, in broiling fatty foods, highly flammable vapors which accumulate during the burner off period in "on" and "off" burner operation; may be flashed when the burner is re-ignited. It is desirable, therefore, to provide a constant burner flame when broiling.

SUMMARY OF THE INVENTION

In accordance with the present invention, a manifold valve device for automatically controlling operation of domestic gas oven burners comprises a body having an inlet, a main burner outlet, and connecting passageway means therebetween. A reset-type, thermoelectric, safety cutoff valve controls the inlet and cuts off all flow therethrough in the absence of pilot burner flame. An adjustable thermostatic actuator responsive to oven temperatures and acting through a clicker disc operates a main valve controlling the main burner outlet in an on and off manner to maintain selected oven temperatures throughout the entire temperature range. There is a tapered rotary plug cock between the safety valve and the main valve, and there is a pilot burner outlet between the safety valve and the plug cock so that the safety valve controls the flow to both main and pilot burners.

A single manually turned knob rotates the plug cock, adjusts the thermostatic actuator, and resets the safety valve. The plug cock is ported and has an "off" position in which no fuel can flow to the main burner outlet. The plug cock can be rotated in one direction from its off position through a wide range of positions, during which fuel may flow to the main burner outlet and during which the thermostatic actuator is adjusted between the lowest and highest oven temperatures to be attained, including broiling temperatures. The plug cock is further ported so as to register with a bypass around the main valve when rotated to "broil" position, thereby to provide a constant flow of gas to the main burner when in broil position. When the manual knob is turned in an opposite direction from the off position to a "pilot light" position, it resets the thermoelectric safety valve in an open position while maintaining the cutoff of all flow to the main burner outlet.

An object of the present invention is to provide a generally new and improved manifold valve device for the control of domestic gas range oven burners in which all flow to both main and pilot burners is cut off in the absence of pilot burner flame.

A further object is to provdie a control device for oven burners in which an adjustable thermostatic actuator controls the flow of fuel to the main oven burner in an on and off manner to maintain selected warming, baking, and broiling temperatures, and in which a constant minimum flow of fuel to the main burner is provided when the thermostatic actuator is adjusted so as to provide broiling temperatures.

A further object is to provide a novel arrangement in a burner control device for gas ovens in which the positioning of a rotary plug valve, the adjustment of a thermostatic actuator, and the resetting of a trip and reset-type safety cutoff valve is conveniently accomplished by rotation of a single manual knob.

Further objects and advantages will become apparent from the following description and accompanying drawings.

1, showing corresponding positions of the broil bypass port; and

Figure 6C:
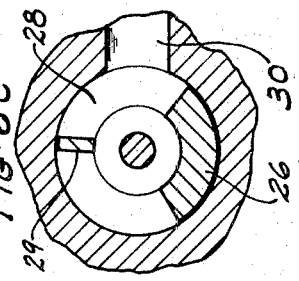
Figure 6B:
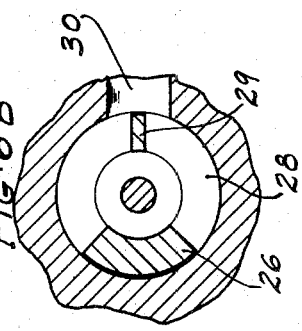
Figure 6A:
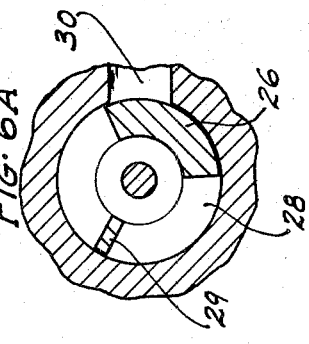
Figure 6:
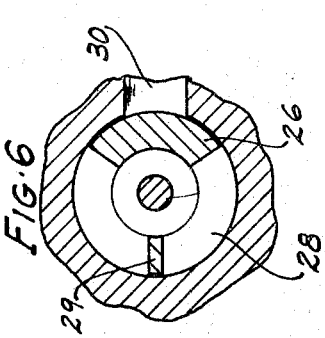

FIGS. 6 to 6C are cross-sectional views through the hollow plug valve, showing corresponding positions of the main port.

DESCRIPTION OF PREFERRED FORM OF THE INVENTION

Figure 1:
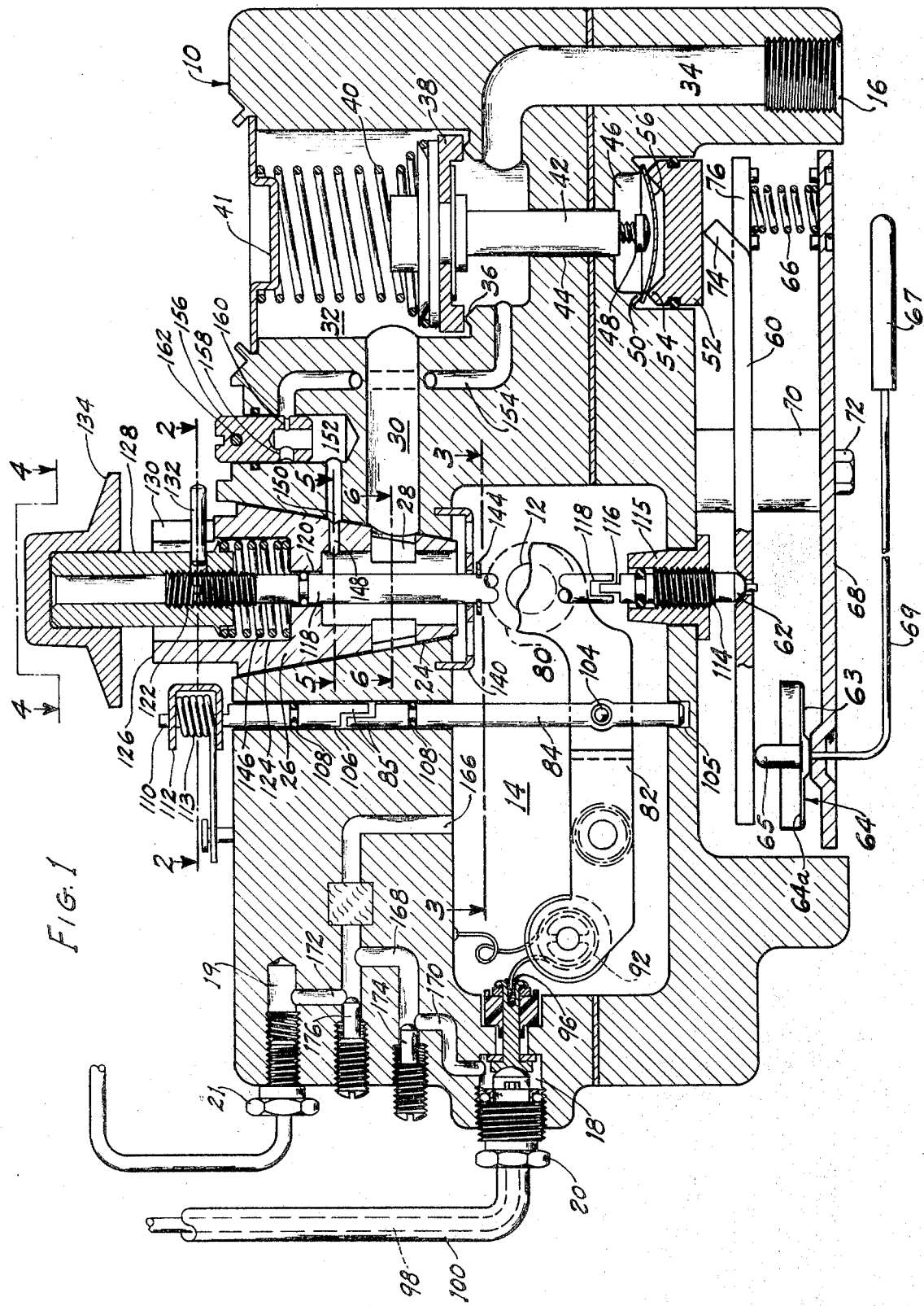
FIG. 1 is a cross-sectional view of a manifold gas valve constructed in accordance with the present invention.

Referring to FIG. 1 of the drawings, a body member generally indicated at 10 has an inlet 12 opening into a chamber 14, a main burner outlet 16, an oven pilot burner outlet 18, and a top burner outlet 19. The main burner pilot burner outlet 16 is screw threaded for connection of a conduit leading to a main oven burner. Pilot burner outlets 18 and 19 are also screw threaded and receive screw-threaded fittings 20 and 21 for connecting fuel conduits leading to, respectively, the oven and top burner pilot burners. A downwardly converging tapered bore 24 opening into chamber 14 forms a seat for a tapered hollow rotary plug cock 26 entered therein. The body 10 may comprise two or more sections suitably connected.

Passageway means leading from chamber 14 to the main burner outlet 16 comprises the hollow plug valve 26 and a circumferentially extensive main port 28 in the wall thereof, a passage 30, a chamber 32, and a passage 34. A valve seat 36 is formed in the lower part of chamber 32, and a valve 38 cooperates with seat 36 to control the flow to main burner outlet 16. The valve 38 is biased closed by a spring 40. A cover plate 41 forms a fluid tight closure of chamber 32. Valve 38 is provided with a downwardly extending valve stem 42 which passes through and is guided in a bore 44 in body 10. Valve stem 42 extends downward into a chamber 46 and has a headed adjusting screw 48 threadedly engaged in its lower end. The main plug valve port 28 is divided by a web 29 so as to prevent weakening the wall of the valve, see FIGS. 6 to 6C.

There is a downwardly facing annular knife edge 50 formed in chamber 46, and a generally cylindrical member 52 vertically slidable in the lower portion of chamber 46 has an upwardly facing annular knife edge 54 of slightly smaller diameter than annular knife edge 50. A normally upwardly concave clicker disc 56 lies between the annular knife edges 50 and 54, which engage opposite peripheral surfaces of the disc. The head of adjustment screw 48 lies close to the upper concave surface of disc 56, so that when cylindrical member 52 is forced upward, the disc 56 is snapped through a planar form to an upwardly convex form and the screw 48 is engaged and moved upward, thereby opening valve 38. When the member 52 is permitted to move downward, the clicker disc 56 snaps back to its normal upwardly concave form, shown, and valve 38 is returned to its closed position by biasing spring 40.

A lever 60 having an intermediate adjustable fulcrum 62 has one end bearing upward against the slidable member 52 and its other end bearing downward against an expansible chamber 64. A relatively strong spring 66 urges the lever 60 in a counterclockwise direction and is capable of applying an upward force to member 52 sufficient to cause the clicker disc 56 to be snapped to an upwardly convex form and to open valve 38. This upward force of helical spring 66 is opposed, however, by an upward force applied by expansion of expansible chamber 64 through a follower 65, and when the oven reaches a selected temperature to be maintained, the force of spring 66 is overcome, thereby permitting valve 38 to close under these conditions. The valve 38, clicker disc 56, lever 60, expansible chamber 64, and spring 66 are shown in FIG. 1 in the position they assume when the selected oven temperature has been attained.

The expansible chamber 64 comprises a cup 63 and a flexible metal diaphragm 64a, and is connected to a bulb 67 by a capillary tube 69. The chamber, bulb, and capillary tube form a sealed system filled with a suitable thermally expansible fluid, and the bulb 67 is positioned so as to be sensitive to oven temperatures. The expansible chamber 64 and the spring 66 are supported on a support plate 68 attached to a body boss 70 by screws 72. The right-hand end of lever 60 has two detached and upwardly formed portions 74 which engage the bottom surface of slidable member 52 at spaced points on a line through the center thereof. The lever also has a straight, central, right-hand end portion 76, the underside of which is engaged by spring 66.

The spring 66 engages the central lever portion 76 at a point spaced outwardly from the point of engagement of laterally spaced portions 74 with the member 52. The purpose of this arrangement is to insure that the left-hand end of lever 60 follows the expansible chamber when it contracts and maintains some downward force against the expansible chamber. While spring 66 is capable of urging slidable member 52 upward with sufficient force to effect the snap through of clicker disc 56, there is substantially no upward movement of member 52 after the snap through of the disc occurs because the member 52 virtually bottoms against the knife-edged shoulder 50. It will be apparent, therefore, that if the force of spring 66 were applied to the member 52 in alignment with the point of contact of lever portions 74, there would be no further upward movement along this line after the disc has snapped through to cause the left end of lever 60 to follow contraction of the expansible chamber 64 and maintain some downward force against it. There is always some continued contraction of the expansible chamber after the disc 56 has snapped through to open the fuel valve until the temperature again rises and the fluid in bulb 67 is again heated, and unless stress is maintained on the flexible metal diaphragm 64a of expansible chamber 64, objectionably wide operation differential would result. By applying the force of spring 66 outboard of the point of contact of portions 74, a downward pressure against the expansible chamber diaphragm 64a is always maintained.

Figure 3:
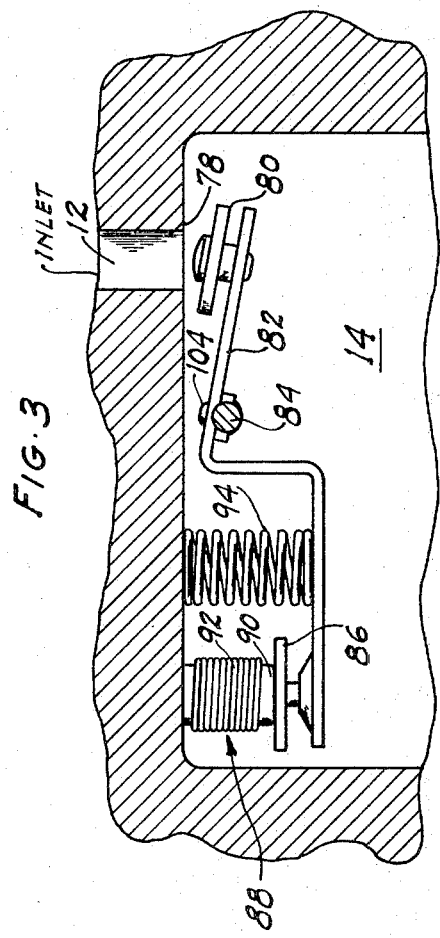
FIG. 3 is a top plan view of the safety valve, its closing spring, and the electromagent which holds it open, the view being taken along line 3—3 of FIG. 1.

There is a valve seat 78 formed at the fuel inlet 12 and a safety cutoff valve 80 cooperates with seat 78 to control flow through the inlet, see FIG. 3. The valve 80 is connected to one end of a horizontal lever 82 which has an intermediate vertically extending pivot pin 84. The other end of lever 82 carries an armature piece 86 adapted to be attracted by an electromagnet 88 having a pole piece 90 and a winding 92. A spring 94 acting against lever 82 biases the valve 80 in a closed position when it is not held open by the attraction of electromagnet 88. One end of winding 92 is connected to a terminal 96 and thence to an electrical lead 98 which extends coaxially with a gas supply tube 100 to a combined pilot burner and thermocouple, see FIG. 1. The gas supply tube 100 also serves as an electrical lead and is grounded to the body 10 through the screw-threaded fitting 20 which clamps the tube in the pilot outlet 18.

The other end of the electromagnetic winding 92 is grounded to the body 10. A combined pilot burner and thermocouple, together with leads and gas supply tube connected to a valve body, is shown and described in an application. Ser. No. 287,609, filed Sept. 11, 1972.

Figure 2:
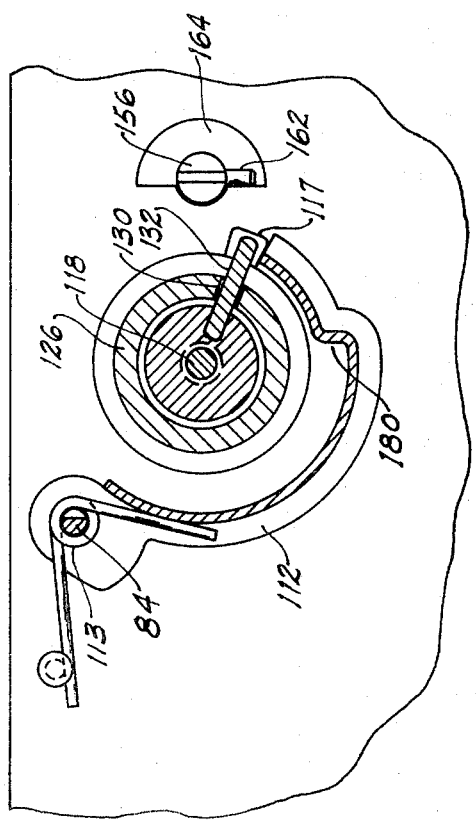
FIG. 2 is a top plan view of the safety valve resetting mechanism and is taken along line 2—2 of FIG. 1.

The vertical pivot pin 84 is rigidly connected to the lever 82 by a rivet 104. Pivot pin 84 is journalled at its lower end in a blind bore 105 and at its upper end in a through bore 106 extending from chamber 14 upward to the exterior of body 10. Rubberlike O-rings 108 surrounding the upper portion of pivot pin 84 provide a fluid seal against leakage from chamber 14. An upper exteriorly projecting end portion 110 of the pivot pin 84 is cut away to provide a D-shaped cross-section and a formed lever 112 having D-shaped holes formed therein is fitted on this end portion. The lever 112 is arcuate in form, see FIG. 2, and is biased in a counterclockwise direction, with reference to FIG. 2, by a coil spring 113. A stop 117 limits counterclockwise rotation of lever 112. The pivot pin 84 comprises two sections having loosely interfitting D-shaped adjacent end portions 85, thereby to provide limited lost motion between arcuate lever 112 at the upper end of the pin and the lever 82 at the lower end of the pin for a purpose to be described.

The hemispherical fulcrum 62 for lever 60 is formed at the lower end of a short screw-threaded rod 114 which is threadedly engaged in a bushing 115 pressed into a bore in the body 10. An upper end portion of short rod 114 is cut away to provide a central flat end portion 116 which is freely received in the slotted lower end of a long vertically arranged adjusting rod 118. The rod 118 extends upward through the chamber 14 and coaxially through the hollow plug valve 26. Rod 118 is journalled in a bore 120 in the upper portion of plug cock 26 and has a screw-threaded upper end portion 122. The upper end of plug valve 26 is provided with a cylindrical cavity 124 and an upwardly extending sleeve portion 126. A bushing 128 extending into sleeve portion 126 is internally screw threaded and receives the upper end of the rod 118 in threaded engagement.

Figure 4C:
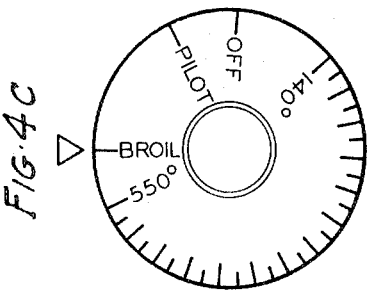
FIGS. 4 and 4C are top plan views of the manual knob taken along line 4—4 of FIG. 1.
Figure 4B:
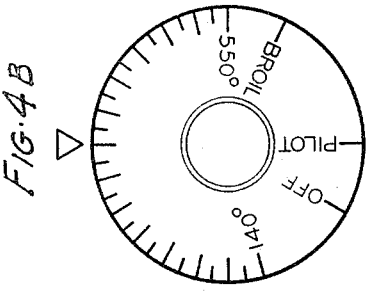

There is an axially extending slot 130 in the sleeve 126, and a lateral pin 132 fixed in the bushing 128 lies in the slot 130 so that the bushing 128 and plug cock 26 rotate together. A knob 134 is fixed on the upper end of bushing 128. The knob 134 is provided with indica on the bezel thereof, as indicated in FIGS. 4 to 4C, and an indexing mark is provided on the body 10 for cooperation therewith.

A spider 140 fixed in the upper wall of chamber 14 permits passage of fuel from chamber 14 to the inside of hollow plug valve 26, while providing a stop against upward movement of rod 118. A C-washer 144 fitted in an annular groove in rod 118 abuts the underside of the spider 140. A spring 146 biased between the lower end of bushing 128 and the bottom of the upper cavity 124 in the plug cock biases the C-washer 144 upward against the spider 140 and biases the tapered plug cock downward on its tapered seat 24.

In addition to the circumferentially extensive main port 28 in the wall of hollow plug cock 26, there is a second auxiliary port 148 of limited circumferential extent in the wall thereof positioned axially above the main port 28. This port 148 is adapted to register with a passage 150 when the plug cock is rotated to a broil position. The passage 150 together with a chamber 152 and a passage 154 forms passageway means leading to the main burner outlet 34 which bypasses the main valve 38. There is a hollow rotatable cock 156 fitted in chamber 152 having two lateral metering ports 158 and 160, arranged 180° apart, which may be interchangeably placed into registry with passage 154 by rotation of cock 156. There is a lateral pin 162 in the cock 156 which rotates in a half circle form depression 164 in the top surface of body 10 to permit 180° rotation of the cock and the convenient interchangeable registry of ports 158 and 160 with passage 154. This arrangement provides convenient interchange of metering ports to accommodate natural or liquid petroleum fuel gas.

A passageway 166 communicating with chamber 14 has a first branch, comprising passages 168 and 170, leading to the oven pilot burner outlet 18 and a second branch 172 leading to the top burner pilot outlet 19. There is a screw-threaded member 174 for adjusting the flow to the oven pilot burner and a screw-threaded member 176 for adjusting the flow to the top burner pilot.

OPERATION

Figure 4A:
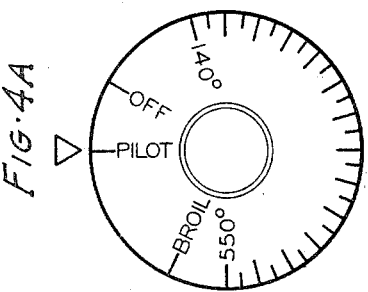
Figure 4:
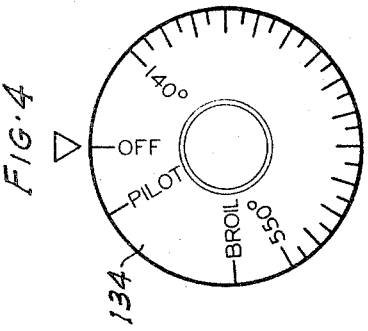
Figure 5C:
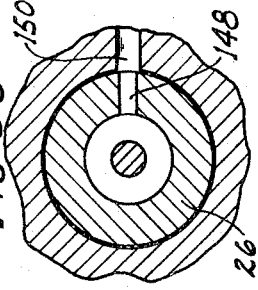
FIGS. 5 to 5C are cross-sectional views through the hollow rotary plug cock taken along line 5—5 of FIG.
Figure 5B:
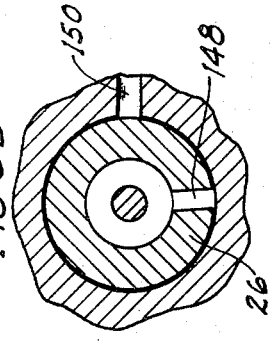
Figure 5A:
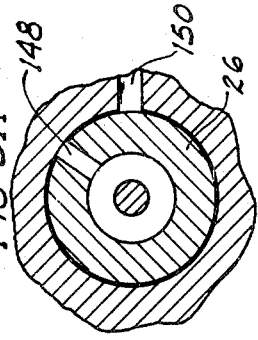
Figure 5:
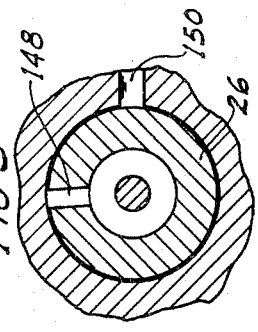

Referring to FIGS. 4, 5, and 6 of the drawings, the manual knob 134 is shown in an "off" position. When the knob is in this position, plug cock 26 is in the position shown in FIGS. 5 and 6, with auxiliary port 148 and main port 28 out of registry with respective passages 150 and 30. Under these conditions, fuel may flow to the pilot burners through passage 166, but no fuel can flow to the main burner outlet. The safety cutoff valve 80 is shown open, see FIG. 3, indicating that pilot flame is present at the oven pilot burner. In the absence of flame at the oven pilot burner, valve 80 will be closed, thereby cutting off all flow to both main and pilot burners.

To relight the pilot burner, the control knob 134 is rotated clockwise from the off position shown in FIG. 4 to the "pilot" position shown in FIG. 4A. This action causes the arcuate lever 112 and the attached pivot pin 84 to be rotated clockwise by the pin 132, see FIG. 2. Clockwise rotation of pivot pin 84 opens cutoff valve 80 and presses armature 86 against pole piece 90 of electromagnet 33, see FIG. 3. Fuel now flows to the pilot burner and is ignited by any suitable means. The knob is held in this pilot position against the bias of springs 94 and 113 until sufficient energy is developed by a pilot-heated thermocouple to hold valve 80 open against the closing bias of spring 94. It will be noted when knob 134 is in the pilot position of FIG. 4A that the auxiliary port 148 and main port 28 are still out of registry with the respective passages 150 and 30, as indicated directly below in FIGS. 5A and 6A. Fuel is therefore prevented from flowing to the main burner outlet when the pilot burner is being ignited.

After the pilot burner is ignited and the cutoff valve 80 is set in an open position, fuel may now be admitted to the main burner outlet by rotating the knob 134 in a counterclockwise direction past the off position to any desired position in the temperature range indicated on the knob. When the knob 134 is rotated counterclockwise to any position, as for example as shown in FIG. 4B, between some warming temperature, as indicated at 140°, and some high baking temperature, as indicated at 550°, the main plug valve port 28 will be in registry with the passageway 30, as indicated in FIG.

6B, and fuel may flow to the main oven burner outlet 16 via the thermostatically controlled valve 38. However, when in any of these positions between these limits, the auxiliary port 148 will not be in registry with passage 150, as shown in FIG. 5B. The strengthening wall portion 29 dividing the circumferentially extensive port 28 is thinner than the diameter of passage 30, so that ample flow may pass even though this portion 29 lies across the passage 30.

When the knob 34 is rotated counterclockwise to the "broil" position, as shown in FIG. 4C, both the main port 28 and the auxiliary port 148 are in registry with their respective passages 30 and 150. A predetermined amount of fuel may therefore now flow to main burner outlet 16 through the bypass passages 150 irrespective of the position of the thermostatic valve 38. This provision maintains a constant main burner flame when broiling. The rate of flue flow through the bypass passages is determined either by orifice 158 or orifice 160 in the cock 156, see FIG. 1 depending upon the heat valve of the fuel. In any event, the rate at which such bypass fuel is supplied to the burner is less than an amount which would cause the oven to overheat even though left unattended.

Counterclockwise rotation of knob 134 and the attached rod 118 causes the short screw-threaded rod 114 and the fulcrum 62 to move upward, see FIG. 1, thereby requiring a higher oven temperature and a greater expansion of expansible chamber 64 to effect closure of thermostatic valve 38. The screw-threaded connection of the upper end of rod 118 to the bushing 128 and therefore the knob 134 provides a factory adjustment, and suitable means is employed to preclude relative rotational movement of the bushing 128 and rod 118 as the knob is rotated in normal operation.

When the knob 134 is rotated in a counterclockwise direction from pilot position, the spring 113 returns the arcuate reset lever 112 to its returned position against stop 117. The lever 112 is permitted to return freely to this position due to the lost motion connection 85 between the upper and lower sections of pivot pin 84. Lever 112 is formed with an offset 180, see FIG. 2, which provides an abutment engaged by pin 132 when knob 134 is rotated counterclockwise to a broil position. Counterclockwise rotation of knob 134 and plug valve 26 beyond the broil position is thereby prevented.

We claim:

1. A fuel flow control device for oven gas burners comprising a body member having an inlet, a main burner outlet, a pilot burner outlet, a thermoelectric safety valve controlling said inlet, a pilot fuel passageway connecting said inlet with said pilot burner outlet, a main fuel passageway connecting said inlet with said main burner outlet, and an auxiliary passageway connecting said inlet with said main burner outlet, a manual rotary valve between said inlet and said main burner outlet controlling said main and auxiliary fuel passageways, said rotary valve having a main port and an auxiliary port, said rotary valve ports being arranged so that when said rotary valve is rotated to one position flow through both main and auxiliary fuel passageways is cut off, and when said rotary valve is rotated in one direction from said one position through a predetermined range fuel is permitted to flow through said main passageway only, and when said rotary valve is rotated further in the same direction to a position beyond said predetermined range fuel is permitted to flow through both said main and auxiliary fuel passages, a snap-action on and off valve in said main fuel passageway between said rotary valve and said main burner outlet controlling flow through only said main burner passageway, adjustable thermostatic means operatively connected to said snap-action valve, and means rotating with said rotary valve and operative to adjust said thermostatic means.

2. A fuel flow control device comprising a body member having an inlet, a main burner outlet, a pilot burner outlet, a first passageway connecting said inlet and main burner outlet, a second passageway connecting said inlet and pilot burner outlet, a resettable safety cutoff valve controlling flow through said inlet, a manual rotary valve and a poppet valve arranged in series in said first passageway, adjustable thermostatic means operatively connected to said poppet valve, said rotary valve having an off position and a pilot reset position in which positions all flow through said first passageway is cut off, means movable with said rotary valve and operative to reset said cutoff valve as said rotary valve is rotated in one direction from said off position to said pilot reset position, said rotary valve being ported so as to permit flow through said first passageway when rotated through a range extending from said off position in a direction opposite to that in which it is rotated to said pilot reset position, and means movable with said rotary valve operative to adjust said thermostatic means.

\* \* \* \* \*